US011396068B2

(12) United States Patent
Kuepper et al.

(10) Patent No.: US 11,396,068 B2
(45) Date of Patent: Jul. 26, 2022

(54) METHOD FOR PRODUCING A ROTATING DISK FOR A TURBOMACHINE

(71) Applicant: MTU Aero Engines AG, Munich (DE)

(72) Inventors: Anna Carina Kuepper, Munich (DE); Waltraud Himmelstoss, Munich (DE); Hans Zimmermann, Landshut (DE); Florian Kreitmair, Hirschenhausen (DE); Heinrich Janko, Dachau (DE); Frank Binder, Unterschleissheim (DE)

(73) Assignee: MTU Aero Engines AG, Munich (DE)

( * ) Notice: Subject to any disclaimer, the term of this patent is extended or adjusted under 35 U.S.C. 154(b) by 128 days.

(21) Appl. No.: 16/453,139

(22) Filed: Jun. 26, 2019

(65) Prior Publication Data

US 2020/0001410 A1 Jan. 2, 2020

(30) Foreign Application Priority Data

Jun. 27, 2018 (DE) .................... 10 2018 210 464.6

(51) Int. Cl.
*B23P 15/02* (2006.01)
*B23P 15/00* (2006.01)
*B23D 43/02* (2006.01)

(52) U.S. Cl.
CPC ............. *B23P 15/02* (2013.01); *B23D 43/02* (2013.01); *B23D 2043/025* (2013.01); *B23P 15/006* (2013.01); *F05D 2230/10* (2013.01)

(58) Field of Classification Search
CPC ............. B23C 2215/56; B23C 2215/52; B23P 15/006; F05D 2230/10; F05D 2230/11–14; B23D 2043/025
See application file for complete search history.

(56) References Cited

U.S. PATENT DOCUMENTS

| 2009/0260994 | A1  | 10/2009 | Joslin |   |
|---|---|---|---|---|
| 2009/0320285 | A1  | 12/2009 | El-Wardany et al. |   |
| 2015/0375312 | A1* | 12/2015 | Mandrile | B23D 37/12 409/244 |
| 2016/0097282 | A1* | 4/2016  | Clark | B23C 3/30 409/178 |
| 2017/0173708 | A1* | 6/2017  | Williams | F01D 25/285 |

FOREIGN PATENT DOCUMENTS

| DE | 69412643 T2 | 4/1999 |
| DE | 102016214807 A1 | 2/2018 |
| DE | 102017207029 A1 | 10/2018 |
| EP | 2070619 A2 | 6/2009 |

* cited by examiner

*Primary Examiner* — Christopher J Besler
(74) *Attorney, Agent, or Firm* — Barlow, Josephs & Holmes, Ltd.; David R. Josephs

(57) ABSTRACT

The present invention is directed to a method for producing a rotating disk for a turbomachine, forming blade root uptakes on a plurality of circumferential positions, for which, in each case, an axially extending profile groove that is bounded circumferentially by inner wall surfaces of the rotating disk is introduced on a respective circumferential position, in which production method, initially first profile grooves are introduced in a disk on first circumferential positions, and subsequently, a second profile groove is introduced in the disk on a second circumferential position located circumferentially between the first profile grooves.

10 Claims, 4 Drawing Sheets

METHOD FOR PRODUCING A ROTATING DISK FOR A TURBOMACHINE

BACKGROUND OF THE INVENTION

Technical Field

The present invention relates to a method for producing a rotating disk for a turbomachine.

Prior Art

The turbomachine may involve, for example, a jet engine, e.g., a turbofan engine. Functionally, the turbomachine is divided into compressor, combustion chamber, and turbine. Roughly speaking, in the case of the jet engine, aspirated air is compressed by the compressor and burned in the downstream combustion chamber with kerosene mixed in. The hot gas that arises, a mixture of combustion gas and air, flows through the downstream turbine and is thereby expanded. The turbine usually has a plurality of stages, each of which is built up from a guide vane ring and a downstream wheel or ring of rotating blades. In each of the individual stages, energy is withdrawn proportionally from the flowing hot gas and is converted into a rotation of the wheels of rotating blades (this rotation can be utilized, e.g., at least proportionally for driving the compressor).

In this case, each of the wheels of rotating blades is built up from a rotating disk on which the rotating blades are mounted circumferentially following one another, each in form-fitting manner. For this purpose, the rotating disk is provided each time with an uptake for a blade root at different circumferential positions, that is, an axially extending profile groove is introduced each time. A blade root is inserted into each profile groove, and the outer wall surface of this blade root then creates a form fit with an inner wall surface of the rotating disk, this surface bounding the profile groove. The rotating blade is held radially in form-fitting manner based on the profiling of the groove.

SUMMARY OF THE INVENTION

The technical problem that is the basis of the present invention is to provide a particularly advantageous method for producing a rotating disk with profile grooves.

This is achieved according to the invention by the method according to the present invention. The profile grooves in this case are introduced by groups one after the other, thus initially first profile grooves on first circumferential positions and subsequently second profile grooves on second circumferential positions. In this way, there is always arranged, in each case, at least one second circumferential position between two first circumferential positions; upon introducing a respective first profile groove, thus in any case, the profile grooves that are immediately adjacent circumferentially are initially left out. The first profile groove(s) immediately adjacent circumferentially then will be supported at their inner wall surfaces when the second profile grooves are introduced.

This procedure is advantageous in this regard, since there is still sufficient disk material present "in between" when the first profile grooves are introduced on the circumferential positions, so that, for example, even in the case of removal of material by machining and the application of force that accompanies this when the first profile grooves are introduced, there is no deformation or no significant deformation (this is critical in regard to the land that remains between two profile grooves). The removal of material by machining may be of interest economically speaking, but it does represent a mechanical stressing. When the second profile grooves are introduced, the disk is already weakened at the first circumferential positions, for which reason the first profile groove or profile grooves will be supported. The grooves are supported each time at their inner wall surfaces, so that a deformation or an offset of the inner wall surfaces relative to one another (into the profile groove) will be opposed.

For illustration, one can consider the land remaining between two profile grooves as a bending beam that is suspended radially inside and has a free end radially outside. Based on the procedure according to the invention, thus leaving the intermediate positions free, the bending beams remaining during the introduction of the first profile grooves are sufficiently thick and thus stable vis-à-vis the preferred removal of material by machining. During the introduction of the second profile grooves, the remaining bending beams are then clearly thinner, but supporting the inner wall surfaces of the first profile grooves nevertheless creates stability. In principle, the first profile grooves can also be introduced by removal without machining, for example erosively, but a machining is preferred; see below.

Preferred embodiments are found in the dependent claims and in the entire disclosure, wherein the presentation always relates to both the production of a rotating disk as well as a corresponding rotating wheel or module of the turbomachine. Indications such as "axial" and "radial" or "circumferential" and the directions belonging thereto refer to the axis of rotation of the rotating disk around which the disk rotates during operation (and which usually coincides with the longitudinal axis of the turbomachine).

The profile grooves can be introduced in different sequence or clocking within a respective group. In the case of the first profile grooves, for example, they can each be introduced sequentially relative to the circumferentially immediately adjacent first circumferential position, which represents, however, only one possibility. In principle, the first profile grooves can be introduced in any sequence whatever or even also simultaneously; sufficient stability is provided by the second circumferential positions remaining intact between them. This applies analogously to the second profile grooves due to the support on the first circumferential positions.

In the following, various preferred possibilities for supporting the first profile grooves will be discussed first.

In a preferred embodiment, an insert is placed in the profile groove to be supported, which is then subsequently removed again. The insert is applied at the inner wall surface, and preferably has a complementary contour, at least in sections when viewed axially, and supports the profile groove. After it is removed, the insert can be used for supporting another profile groove, for example of the same disk in a sequential processing or of a rotating disk produced subsequently.

In a preferred embodiment, the insert has a clamping device, with which it can be expanded in the circumferential direction after its insertion and thus can be spread apart. For example, a wedge mechanism can be provided as a clamping device, e.g., driven by a clamping bolt or a screw bolt. When clamping, for example, a wedge or a double wedge can be displaced axially or even radially, and in this case, can press a clamping piece of the insert having corresponding oblique flanks outward in the circumferential direction. The insert will be spread apart by activating the clamping device; it can be inserted and removed reversibly (after releasing the clamping device); at the same time, high supporting forces are possible.

In another preferred embodiment, a backfilling material is introduced into the supporting profile groove. When it is introduced, it is in a formless or neutral state, but is transformed into a dimensionally stable state in the profile groove. Subsequently, the backfilling material is then removed again from the profile groove, which can be carried out, for example, chemically, thermally or also erosively or mechanically, depending on the backfilling material (if the dimensionally stable backfilling material is "softer" than the disk material, a mechanical removal may represent a lesser stressing than introducing a profile groove by machining).

In one preferred embodiment, if the backfilling material is introduced in an at least viscous, free-flowing form, it can be poured in, for example, or also filled in. Preferably, a plastic material can be used, in particular a hard plastic, e.g., polycarbonate. Alternatively, however, a metal backfilling material, e.g., aluminum, is also possible. In the individual case, it can also depend on the geometry of the profile grooves (D/W, see below) whether it can be supported with a plastic material that is easy to separate, or whether a metal backfilling material is necessary.

In one preferred embodiment, the formless/form-neutral backfilling material that is introduced does not in itself fill up the entire profile groove, but rather a shaped piece (in a dimensionally stable state) is additionally introduced into the profile groove. The latter is thus attached in the profile groove by joining, as it were; for example, it is glued in. Subsequently then, only the backfilling material need be separated and the shaped piece can then be removed, or the backfilling material plus the shaped piece can also be separated together.

In one preferred embodiment, a second profile groove always lies precisely circumferentially between two first profile grooves. In the introduction thereof, both circumferentially immediately adjacent first profile grooves are supported. In contrast, if more than one circumferential position lies between two first profile grooves, it may be sufficient also during the introduction of the second profile groove, if only one circumferentially immediately adjacent first profile groove is supported, since there is still enough disk material remaining in the opposite circumferential direction.

As long as intermediate positions remain, in fact, in general, a certain interleaving is conceivable during the introduction of the first and second profile grooves. For example, two circumferentially immediately adjacent first profile grooves can be introduced and supported, and then the second profile groove in between them can still be introduced prior to introducing further first profile grooves. In the preferred embodiment, however, initially all first profile grooves will be introduced and then all second profile grooves will be subsequently introduced.

In one preferred embodiment, all first profile grooves are supported when a respective second profile groove will be introduced. Then, with support, there is thus no alternation from groove to groove (which is possible in general); rather, a backfilling material or insert is placed in all first profile grooves, then the second profile grooves will be introduced.

In one preferred embodiment, the first profile grooves are introduced by removing material by machining, thus with a geometrically specific cutting, or, in general, even a non-specific cutting. A milling is also conceivable, for example, preferably a broaching, for example, with a broaching tool made of a high speed steel (HSS). The broaching itself may be of interest economically when compared to other machining methods, wherein the advantage thereof comes fully to bear first in the course of the procedure according to the invention. As discussed initially, the disk material is less susceptible to deformation during the introduction of the first profile grooves due to the adjacent initially remaining intermediate positions; therefore, during the removal of material, larger forces are not harmful. Since forces typically increase with tool wear, service life can be prolonged with the approach according to the invention. If, in contrast, the admissible forces are clearly limited during machining due to the "thinner" land, this would mean a frequent change of tool with corresponding economic disadvantages. The required tolerances also sometimes can no longer or just barely be achieved (also a force-optimized broaching tool is never completely force-free), which would make necessary expensive manual post-processing.

In one preferred embodiment, the second profile grooves are introduced by removing material by machining, in particular by broaching. The advantages depicted for the first profile grooves apply analogously here. Based on the support, a greater input of force is possible when the second profile grooves are introduced; thus, the tools can be utilized for a longer time and/or a manual post-processing will be superfluous.

In an alternatively preferred embodiment, the second profile grooves are introduced in a chip-free removal method (thus a non-machining method), for example, erosively, e.g., by spark or wire erosion (EDM). The advantage of an erosive method may lie in a lesser input of force (in comparison to machining). This subject is thus also independent from the support of the first profile grooves according to the main claim that is considered to be the invention, and will be disclosed accordingly. The subject of the disclosure is thus also, in particular, a method in which initially the first profile grooves are introduced without chip formation, or preferably, they will be introduced by machining, and subsequently, the second profile grooves will be introduced erosively, wherein a support of the first profile grooves is not necessary (it is possible, but not obligatory).

A preferred embodiment relates to the geometry of the profile grooves or the land remaining therebetween, concretely the ratio of the radial groove depth D and the land width W taken in the circumferential direction. This ratio preferably lies at least at 2.5, wherein at least 3 or further 3.5 are particularly preferred. Possible upper limits can lie, for example, at 8 or 7 at most. A correspondingly high D/W ratio can be found in the high-speed low-pressure turbine, for example, in the case of a geared turbofan engine. Without the procedure according to the invention, profile grooves with a D/W ratio greater than 2.5 or 3.5 can no longer be produced in any economically meaningful way (tool service life and manual post-processing; see above).

Often rotating disks also tend to become smaller (from one generation to the next), whereby the number of blades usually increases (in order to obtain a comparable or improved efficiency). The components become more filigreed or intricate; therefore, the land widths decrease, while the D/W ratio increases. In principle, the required tolerances also are stricter, but these can be achieved nevertheless with the present approach either wholly without manual post-processing or at least with limited post-processing.

In detail, the radial depth T is taken in each case down to the bottom of the profile of the respective profile groove, and in fact, starts from the periphery of the disk. The width W is taken at the level of a constriction of the land, thus radially inside the support flanks of the two immediately adjacent grooves. The profile grooves can be provided as so-called dovetail grooves; each of the inner wall surfaces can thus precisely form one support flank. On the other hand, however, profile grooves shaped like fir trees may also be preferred, whereby at least two support flanks are arranged at each inner wall surface.

Correspondingly, there is also then a plurality of constrictions over the radial extent of the land, wherein the width W in this case is taken as the arithmetic mean of the widths at these constrictions.

The invention also relates to a method for producing a module of a turbomachine, in particular an aircraft engine. The module may preferably involve a turbine module, in particular a low-pressure turbine module. It comprises a blade wheel having a presently discussed rotating disk, with rotating blades being inserted in the profile grooves thereof. Of course, the module may also have a plurality of such blade wheels.

BRIEF DESCRIPTION OF THE DRAWINGS

In the following, the invention will be explained more closely on the basis of an exemplary embodiment, wherein the individual features in the scope of the independent or coordinated claims can also be essential to the invention in another combination, and wherein also no distinction is made individually between the different claim categories.

Taken individually.

DESCRIPTION OF THE INVENTION

Figure 1:
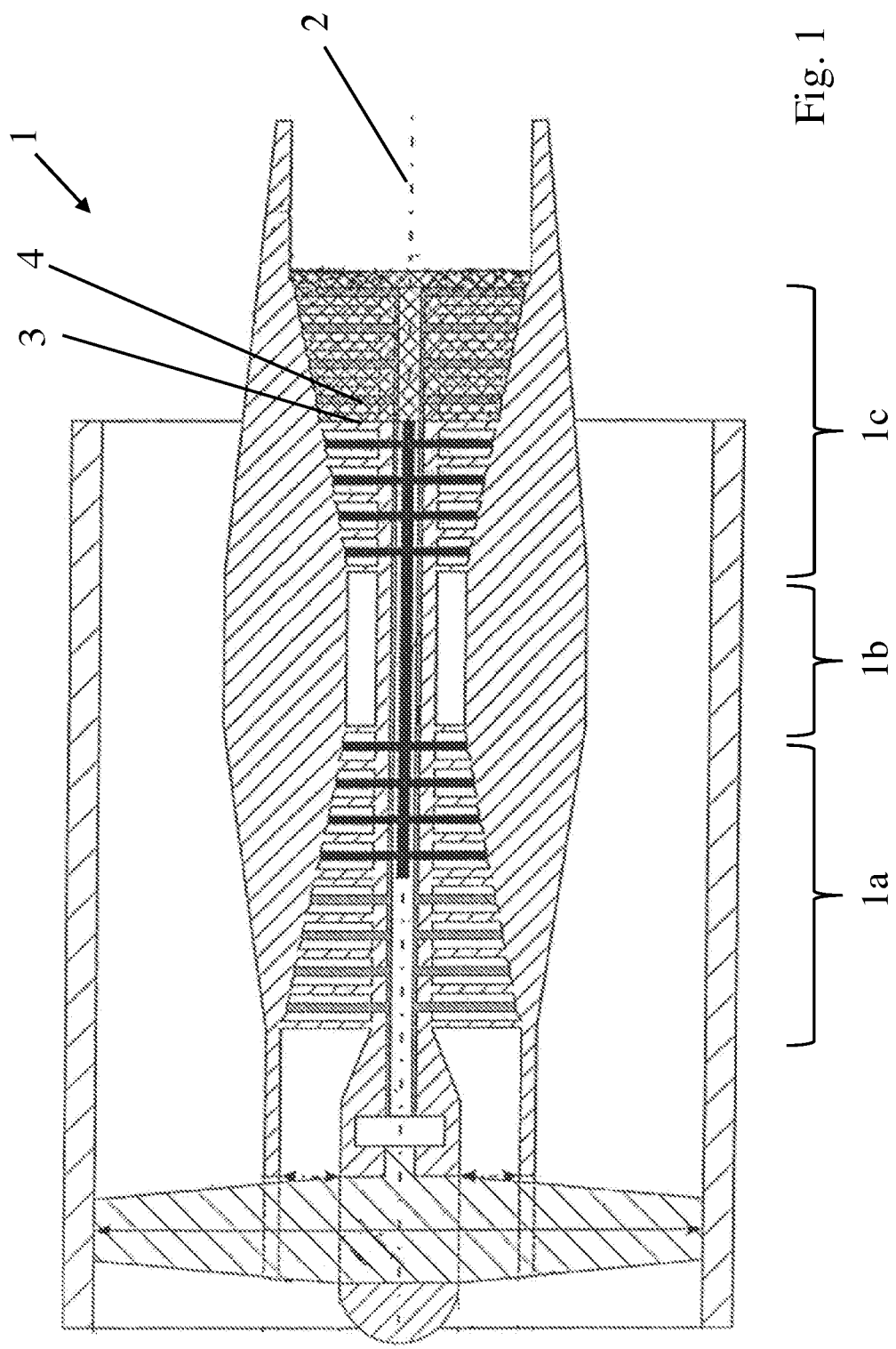
FIG. 1 shows a jet engine in an axial section.

FIG. 1 shows a turbomachine 1, concretely a turbofan engine, in an axial section. Functionally, the turbomachine 1 is divided into compressor 1a, combustion chamber 1b, and turbine 1c. Both the compressor 1a as well as the turbine 1c are each constructed from two stages. Each of the stages is composed of a guide vane ring and a following rotating blade wheel. For reasons of clarity, for the turbine 1c, reference numbers are given only to one of the stages for the guide vane ring 3 and the rotating blade wheel 4 belonging thereto. Aspirated air is compressed in the compressor 1a and is then burned in the downstream combustion chamber 1b with kerosene mixed in. The hot gas flows through the hot-gas channel and in this way propels the rotating blade wheel 4 or the rotating blade wheels, which rotate(s) around the axis of rotation 2.

Figure 2:
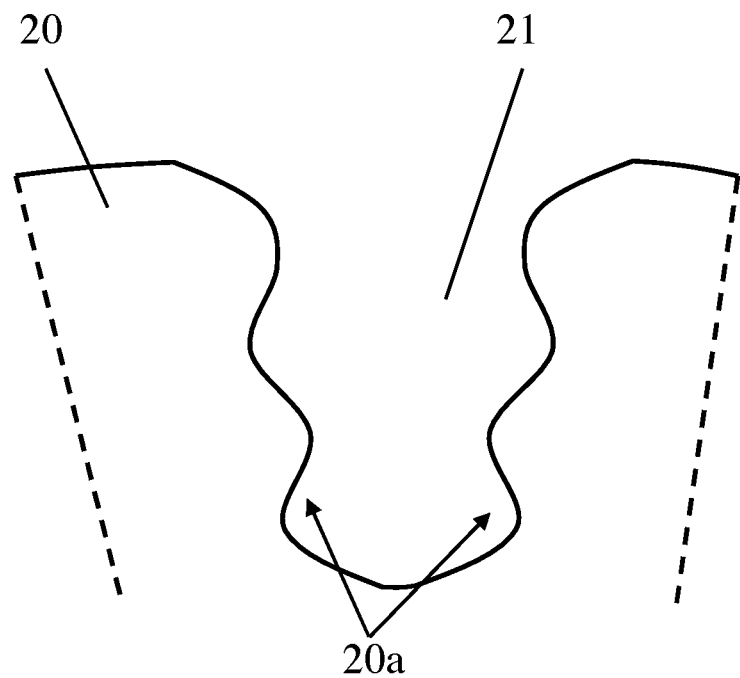
FIG. 2 shows an excerpt of a rotating disk with a profile groove.
Figure 3:
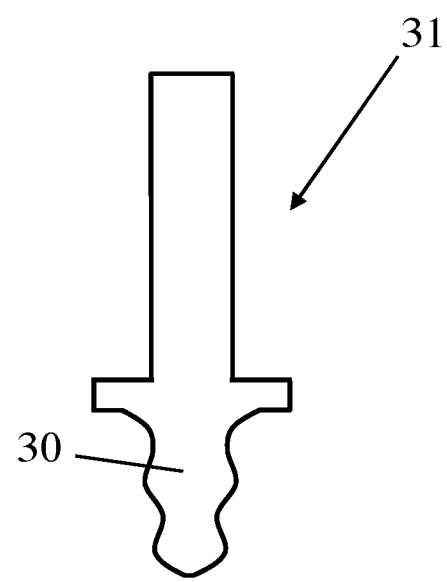
FIG. 3 shows in schematic representation a rotating blade with a blade root for inserting into the rotating disk according to FIG. 2.

FIG. 2 shows a detail view of a part of the rotating blade wheel 4, namely a rotating disk 20. A profile groove 21 is introduced into this disk, and a blade root 30 of a rotating blade 31 is inserted into this groove; compare FIG. 3 for illustration. Based on the profiling of the profile groove 21, thus based on the contour of the inner wall surfaces 20a, the rotating blade 31 is held radially therein in form-fitting manner.

Figure 4A:
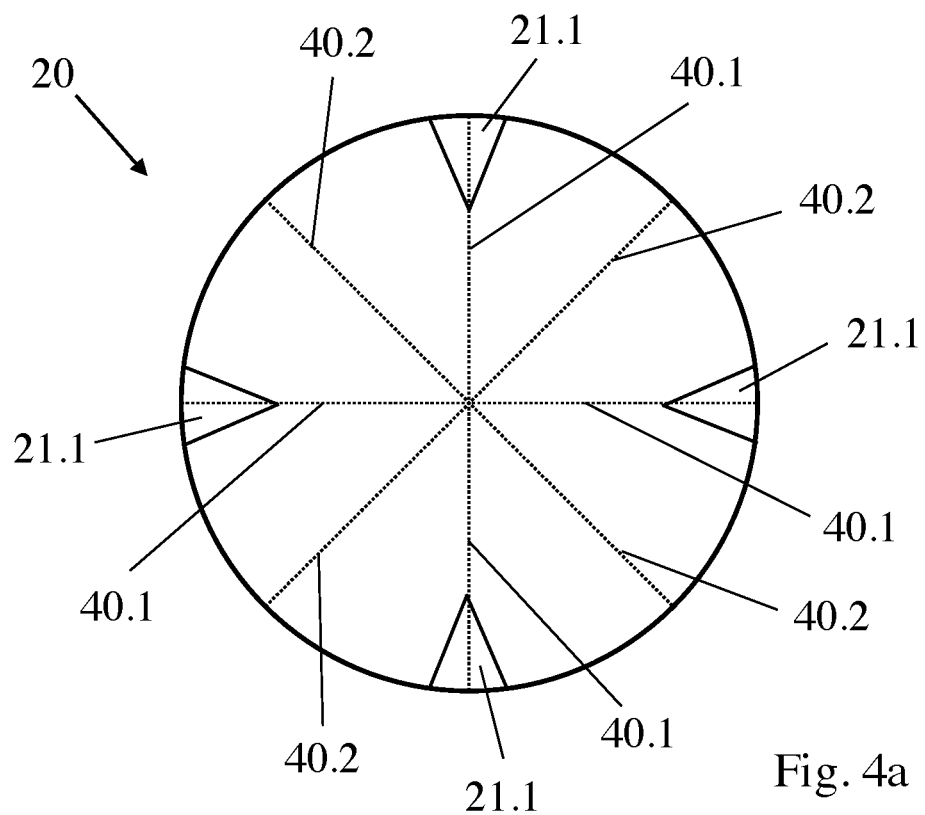
FIGS. 4a-c show a rotating disk in schematic representation for illustrating the production process according to the invention.
Figure 4B:
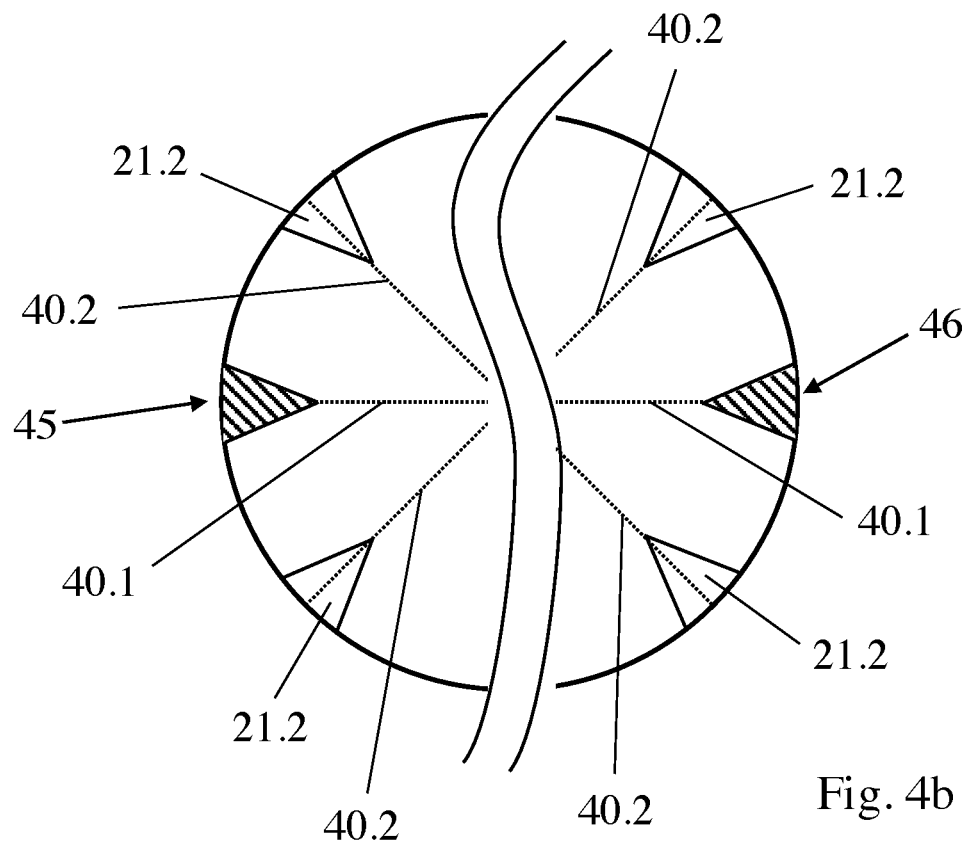
Figure 4C:
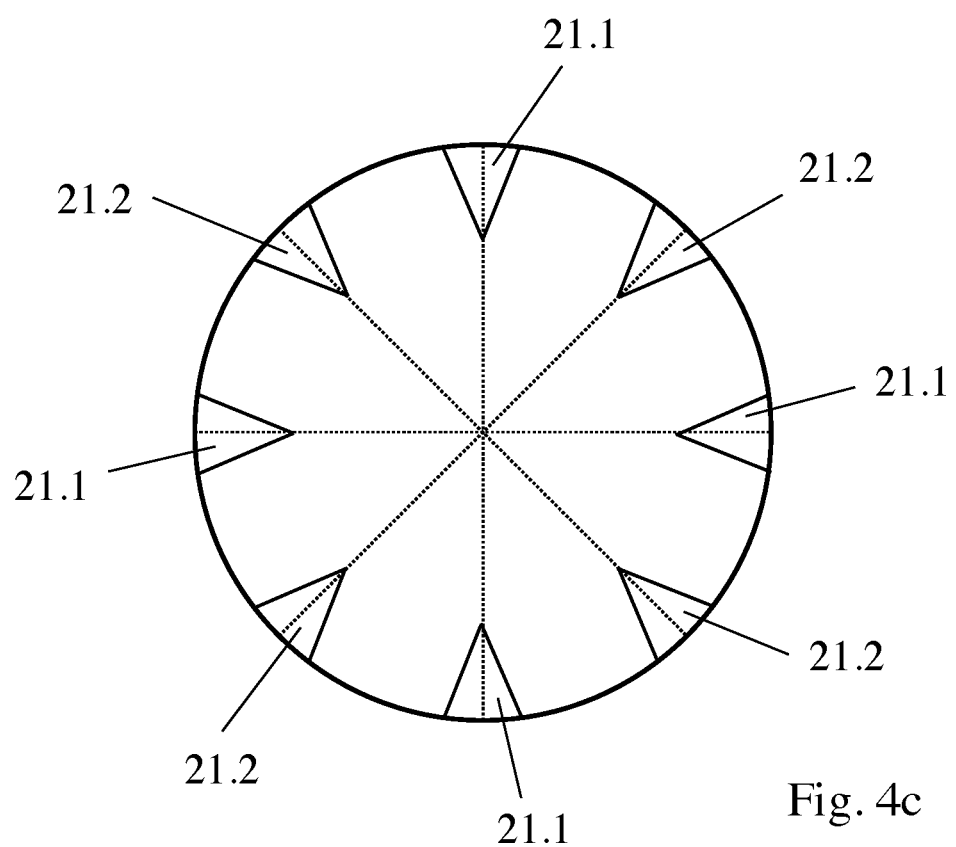

The production of the rotating disk 20 is explained on the basis of FIGS. 4a-c. In a first step according to FIG. 4a, the first profile grooves 21.1 are introduced in the disk 20 onto the first circumferential positions 40.1 Between each of the first circumferential positions 40.1 is arranged each time a second circumferential position 40.2; thus, intermediate positions initially remain free. Correspondingly, if sufficient material is always still present circumferentially, the first profile grooves 21.1 thus can be introduced by broaching.

Subsequently, according to FIG. 4b, an insert 45 or backfilling material 46 is arranged in the first profile grooves 21.1. In practice, typically one of the two alternatives is selected; for reasons of clarity, both are depicted in FIG. 4b. Then, according to FIG. 4b, when the second profile grooves 21.2 are introduced on the second circumferential positions 40.2, the first profile grooves 21.1 are supported in this way. Correspondingly, the second profile grooves 21.2 can also be introduced by broaching; refer to the information on advantages given in the introduction to the description. The inserts 45 or the backfilling material 46 is or are then removed again; see FIG. 4c. There results a close staggering of the profile grooves 21.1, 21.2) or a large D/W ratio.

What is claimed is:

1. A method for producing a rotating disk for a turbomachine, the method comprising,
    providing a disk,
    initially forming first blade root uptakes at a plurality of first circumferential positions about said disk, by introducing first profile grooves in the disk at said plurality of respective first circumferential positions, each of the first profile grooves having respective inner wall surfaces, and
    subsequently forming second blade root uptakes by introducing second profile grooves in the disk at a plurality of second circumferential positions about said disk, each of said second circumferential positions located circumferentially between two of the first profile grooves,
    wherein, at least one second profile groove of the second profile grooves is located circumferentially between every two of the first profile grooves,
    wherein, during the formation of each second profile groove of the second profile grooves, each first profile groove of the first profile grooves adjacent the second profile groove being formed are supported by an insert,
    wherein a land remaining between one first profile groove of the first profile grooves and the at least one second profile groove, that is a circumferentially adjacent to the one first profile groove, has a width W taken in a circumferential direction and the one first profile groove and the at least one second profile groove each have a radially taken depth D, and
    wherein $D/W \geq 2.5$.

2. The method according to claim 1, wherein the insert is applied to the inner wall surfaces of each of said first profile grooves adjacent the second profile groove being formed for support and is removed after the introduction of the second profile groove therebetween.

3. The method according to claim 2, wherein the insert has a clamping device and, after the insert is introduced into the circumferentially adjacent first profile groove, by activating the clamping device, it is widened in a circumferential direction, and is thus spread apart, bracing the inner wall surfaces.

4. The method according to claim 1,
    wherein the first and the second circumferential positions alternately follow one another circumferentially, and
    wherein during the formation of the second profile groove step, the two circumferentially immediately adjacent first profile grooves of the first profile grooves are supported at a respective inner wall surfaces.

5. The method according to claim 4, wherein, during the formation of each second profile groove step each adjacent first profile groove of the first profile grooves are supported at their inner wall surfaces.

6. The method according to claim 1, wherein the first profile grooves are introduced by removing material by machining.

7. The method according to claim 1, wherein the at least one second profile groove is introduced by removing material by machining.

8. The method according to claim 1, wherein the at least one second profile groove is introduced by a removal method without machining.

9. The method according to claim 1, wherein the first profile grooves and the at least one second profile groove are configured in the form of fir tree grooves, wherein a plurality of support flanks are formed each time at each of the inner wall surfaces.

10. The method according to claim 1, wherein the rotating disk is assembled into a module with a rotating blade wheel and rotating blades, the rotating blades with a respective rotating blade root are inserted into the first and second profile grooves.

* * * * *